United States Patent
Borsos et al.

(10) Patent No.: US 12,231,292 B2
(45) Date of Patent: Feb. 18, 2025

(54) NETWORK PERFORMANCE ASSESSMENT

(71) Applicant: Telefonaktiebolaget LM Ericsson (publ), Stockholm (SE)

(72) Inventors: Tamas Borsos, Budapest (HU); Zsófia Kallus, Budapest (HU); Péter Kersch, Budapest (HU); Peter Vaderna, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/000,856

(22) PCT Filed: Jun. 10, 2020

(86) PCT No.: PCT/IB2020/055437
§ 371 (c)(1),
(2) Date: Dec. 6, 2022

(87) PCT Pub. No.: WO2021/250445
PCT Pub. Date: Dec. 16, 2021

(65) Prior Publication Data
US 2023/0216737 A1   Jul. 6, 2023

(51) Int. Cl.
*H04L 41/0823* (2022.01)
*H04L 41/0813* (2022.01)
(Continued)

(52) U.S. Cl.
CPC ...... *H04L 41/0823* (2013.01); *H04L 41/0813* (2013.01); *H04L 41/16* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 2004/0266442 A1* | 12/2004 | Flanagan | H04W 16/18 455/445 |
| 2008/0091815 A1* | 4/2008 | Rao | H04L 67/125 709/223 |

(Continued)

FOREIGN PATENT DOCUMENTS

WO   2019/211134 A1   11/2019

OTHER PUBLICATIONS

International Search Report and Written Opinion dated Feb. 23, 2021 issued in PCT Application No. PCT/IB2020/055437, consisting of 16 pages.

(Continued)

*Primary Examiner* — Atta Khan
(74) *Attorney, Agent, or Firm* — Sonoda & Kobayashi Intellectual Property Law; Sarvajit S. Patil

(57) ABSTRACT

There is provided a method for assessing network performance. The method includes acquiring network measurements indicative of any changes in a network following a change to a configuration of the network and data indicative of one or more factors capable of causing the changes in the network. The one or more factors are independent of the change to the configuration of the network. The method includes analysing the acquired network measurements and data to identify a contribution of the one or more factors to a key performance indicator (KPI) and a contribution of the change to the configuration of the network to the KPI. The KPI is predicted by a machine learning model and is a measure of the network performance following the change to the configuration of the network.

30 Claims, 5 Drawing Sheets

(51) Int. Cl.
   *H04L 41/16*    (2022.01)
   *H04L 43/08*    (2022.01)

(56) References Cited

U.S. PATENT DOCUMENTS

| | | |
|---|---|---|
| 2009/0203373 A1 | 8/2009 | Alvarez Medina et al. |
| 2010/0075682 A1 | 3/2010 | del Rio Romero et al. |
| 2010/0203881 A1 | 8/2010 | del Rio Romero et al. |
| 2019/0068443 A1 | 2/2019 | Li et al. |
| 2019/0306023 A1* | 10/2019 | Vasseur .................. G06N 20/20 |
| 2020/0059417 A1 | 2/2020 | De Buitleir |

OTHER PUBLICATIONS

Lundberg, Scott M et al., A Unified Approach to Interpreting Model Predictions, Conference on Neural Information Processing Systems (NIPS 2017), Long Beach, CA, Nov. 25, 2017, consisting of 10 pages.

\* cited by examiner

NETWORK PERFORMANCE ASSESSMENT

CROSS-REFERENCE TO RELATED APPLICATION

This application is a Submission Under 35 U.S.C. § 371 for U.S. National Stage Patent Application of International Application Number: PCT/IB2020/055437, filed Jun. 10, 2020entitled "NETWORK PERFORMANCE ASSESSMENT," the entirety of which is incorporated herein by reference.

TECHNICAL FIELD

The disclosure relates to methods for use in assessing network performance and nodes configured to operate in accordance with those methods.

BACKGROUND

In the area of operations support systems (OSS) and self-organising networks (SON), there exist open and closed control loops. In an open control loop, the loop may be partly automated but humans make the decisions. In a closed control loop, the loop is fully automated and humans only supervise the overall performance. SONs have become popular for automation in fifth generation (5G) networks and beyond, since manual configuration becomes increasingly suboptimal with higher density cells. Instead, an automation layer is preferred. An automation layer relies on a network management system to acquire measurements from the nodes about the system state and to send back local actions. SON applications can use various services based on data and automation, as well as mediation and control. Some example applications are intra-frequency load balance, cell outage compensation, or coverage optimisation, such as remote electrical tilt (RET).

US 2010/0203881 discloses a system for improving service quality and cell coverage by using an iterative process which periodically collects key performance indicator (KPI) statistics from a mobile wireless network. Specific rules are defined for these KPIs and each of them can have a unique combination of minimum or maximum KPI thresholds. System issues may be identified when a cell KPI correlates with one or more of the rules, which may then suggest one or more parameter changes to reduce the identified system issue. An iterative process is disclosed, where new configuration parameters are derived from the measured KPIs and the change effects are observed by new KPI measurements.

Coverage optimisation is one of the main reasons for the automation stages of existing techniques. In existing techniques for RET, there is an incremental controller used for iteratively calculating changes in antenna tilt based on real-time system state measurements. It is based on rules generated from previous knowledge. The controller works sequentially from cell to cell and treats each cell in a separate control loop. In these local control decisions, the logic can use information and measurements from neighbouring cells. Problem indicators are used to describe local system state, i.e. the network state. For local optimisation, the local network KPI's are translated by an automation engine to proposed local antenna tilt changes in one-degree increments.

The various higher-level but local factors to be considered in generating the rules define a trade-off triangle. The three drivers of the tilt (e.g. up-tilt or down-tilt) decision are quality of the service (where overshooting, interference, and overlapping of the source and target are considered), coverage (where poor coverage on the cell edge is considered), and capacity (when radio resource control (RRC) congestion rate is considered for each cell decision making loop). One example of a rule in this context may be the following: if there is no congestion issue in the evaluated cell and cell edge users have poor quality, then perform up-tilt on the given antenna. These rules are described KPI's and can be translated into a proposed action by a so-called coverage policy. To make the final decision in the local antenna tilt problem, a method can be used to reconcile all policies of the trade-off triangle using pre-defined priorities or relative weighted sums of propositions. The validation of the proposed actions can be verified by radio simulation systems with state representation and KPI calculation.

In some existing techniques, the policy for taking actions given the measured KPIs are built by reinforcement learning techniques. These techniques are advanced compared to expert-written rules as a policy table is built in an automatized way using simulations and/or real measurements. However, the observed KPIs and the inferred reward is noisy and includes environmental variations, which decreases the learning speed and efficiency. In a live network, it is important to reduce the number of explorative steps as many of these will drive the network into a suboptimal state.

Having said that, an important component of iterative algorithms such as those described earlier is the exploration of system feedback on specific network configuration changes. In particular, it is useful to assess network performance following network configuration changes. In some existing techniques, a trial-and-error process is used to assess the impact of configuration changes on network performance. However, this can be a lengthy and time-consuming process and can result in the network operating in a suboptimal state, as mentioned earlier. In other existing techniques, an expected impact of network configuration changes on network performance may be estimated with calculations or simulations, or by applying machine learning (ML) or artificial intelligence (AI) techniques. However, in a real and live environment, the trustworthiness of these estimations is limited by the huge number of potential influencing factors. For example, a measured controlling KPI can be strongly affected by environment variation and fluctuations in traffic load and number/location of subscribers. As a result, the estimation of the effect of a specific network configuration change on the KPI is uncertain.

One solution is to set parameter limits to protect the system from unwanted side-effects due to the unpredictable environment. However, this can limit the capabilities of the system. Moreover, it is difficult to determine how long a verification measurement may be required to obtain high confidence that an observed KPI improvement is actually due to a network configuration change and not due to some other variable factor. The accuracy in assessing an impact of network configuration changes may be improved by grouping cells of the network based on a similarity of environment and traffic conditions. However, this is difficult to implement in practice.

SUMMARY

It is thus an object of the disclosure to obviate or eliminate at least some of the above-described disadvantages associated with existing techniques.

Therefore, according to an aspect of the disclosure, there is provided a method for assessing network performance. The method comprises acquiring network measurements indicative of any changes in a network following a change to a configuration of the network and data indicative of one or more factors capable of causing the changes in the network. The one or more factors are independent of the change to the configuration of the network. The method comprises analysing the acquired network measurements and data to identify a contribution of the one or more factors to a key performance indicator (KPI) and a contribution of the change to the configuration of the network to the KPI. The KPI is predicted by a machine learning model and is a measure of the network performance following the change to the configuration of the network.

There is thus provided an advantageous method for assessing network performance. In particular, the method takes into account additional factors that may have an impact on the predicted KPI in order to provide the information necessary to determine the actual effect that the change to the configuration of the network had on the predicted KPI. For example, the method can identify the precise impact of a given network configuration change accounting for other factors, such as environmental and configured variables. The method thus provides improved accuracy in the evaluation of network configuration changes. In this way, the configuration of the network can be better optimised.

In some embodiments, the method may comprise determining whether to maintain the change to the configuration of the network based on the contribution of the change to the configuration of the network to the KPI.

In some embodiments, determining whether to maintain the change to the configuration of the network may comprise determining whether the change to the configuration of the network is an improvement based on the KPI and contribution of the change to the configuration of the network to the KPI and determining that the change is to be maintained if the change to the configuration of the network is determined to be an improvement.

In some embodiments, the method may comprise comparing the predicted KPI to a reference KPI to identify a difference. In some embodiments, the difference may be indicative of the contribution of the one or more factors and the change to the configuration of the network to the KPI.

In some embodiments, the contribution of the one or more factors to the KPI may be the contribution of the one or more factors to the difference and the contribution of the change to the configuration of the network to the KPI may be the contribution of the change to the configuration of the network to the difference.

In some embodiments, the method may comprise, for each of the one or more factors, identifying the contribution of that factor to the difference and/or identifying an average of the contribution of the one or more factors to the difference.

In some embodiments, the method may comprise filtering out the contribution of the one or more factors to the KPI to identify the contribution of the change to the configuration of the network to the KPI.

In some embodiments, the method may comprise performing the method for a plurality of different changes to the configuration of the network.

In some embodiments, the method may comprise comparing the contributions of the different changes to the configuration of the network to the respective KPIs.

In some embodiments, the method may comprise selecting one of the plurality of different changes to the configuration of the network based on the comparison.

In some embodiments, the network measurements may comprise network measurements indicative of any changes in one or more layers of the network.

In some embodiments, the network measurements indicative of any changes in the one or more layers of the network may comprise network measurements indicative of any events in the one or more layers of the network.

In some embodiments, the one or more layers may comprise a session layer of the network.

In some embodiments, the network measurements may comprise network measurements on one or more network elements.

In some embodiments, the one or more network elements may be one or more network elements in respect of which the change to the configuration of the network is expected to have an impact In some embodiments, the network measurements on the one or more network elements may comprise any one or more network element performance measurements and/or one or more network element event measurements.

In some embodiments, the one or more factors may comprise any one or more of one or more configuration changes inside the network, one or more configuration changes outside the network, one or more faults in the network, one or more service layer descriptors, one or more data sources outside the network, a location of one or more user equipments in the network, and/or one or more environmental events.

According to another aspect of the disclosure, there is provided a first node comprising processing circuitry configured to operate in accordance with the method for assessing network performance described earlier. The first node thus provides the advantages described earlier in respect of the method for assessing network performance. In some embodiments, the first node may comprise at least one memory for storing instructions which, when executed by the processing circuitry, cause the first node to operate in accordance with the method for assessing network performance described earlier.

According to another aspect of the disclosure, there is provided a method for training a machine learning model to predict a key performance indicator (KPI) for use in assessing network performance. The method comprises acquiring training data comprising network measurements indicative of any changes in a network following a change to a configuration of the network and data indicative of one or more factors capable of causing the changes in the network. The one or more factors are independent of the change to the configuration of the network. The method comprises training the machine learning model to predict a KPI based on the acquired training data. The KPI is a measure of a predicted network performance following a change to a configuration of the network.

There is thus provided an advantageous method for training a machine learning model to predict a KPI for use in assessing network performance. In particular, the method provides a more accurate KPI, which is predicted taking into account additional factors that are capable of causing the changes in the network, such as environmental and configured variables. The method thus provides improved accuracy in the prediction of a KPI. In this way, the KPI can be more valuable in optimising the configuration of the network.

In some embodiments, the training data may be acquired continuously or iteratively.

In some embodiments, the method may comprise retraining the machine learning model based on updated training data.

In some embodiments, the training data may be a vectorized set of training data.

In some embodiments, the network measurements may comprise network measurements indicative of any changes in one or more layers of the network.

In some embodiments, the network measurements indicative of any changes in the one or more layers of the network may comprise network measurements indicative of any events in the one or more layers of the network.

In some embodiments, the one or more layers may comprise a session layer of the network.

In some embodiments, the network measurements may comprise network measurements on one or more network elements.

In some embodiments, the one or more network elements may be one or more network elements in respect of which the change to the configuration of the network is expected to have an impact In some embodiments, the network measurements on the one or more network elements may comprise any one or more network element performance measurements and/or one or more network element event measurements.

In some embodiments, the one or more factors may comprise any one or more of one or more configuration changes inside the network, one or more configuration changes outside the network, one or more faults in the network, one or more service layer descriptors, one or more data sources outside the network, a location of one or more user equipments in the network, and/or one or more environmental events.

According to another aspect of the disclosure, there is provided a second node comprising processing circuitry configured to operate in accordance with the method for training a machine learning model described earlier. The second node thus provides the advantages described earlier in respect of the method for training a machine learning model. In some embodiments, the second node may comprise at least one memory for storing instructions which, when executed by the processing circuitry, cause the second node to operate in accordance with the method for training a machine learning model described earlier.

According to another aspect of the disclosure, there is provided a method performed by a system, the method comprising the method for assessing network performance as described earlier and the method for training a machine learning model as described earlier in respect of the second node. The method thus provides the advantages described earlier in respect of the method for assessing network performance and the method for training a machine learning model.

According to another aspect of the disclosure, there is provided a system comprising the first node as described earlier and the second node as described earlier. The system thus provides the advantages described earlier in respect of the first node and/or second node.

According to another aspect of the disclosure, there is provided a computer program comprising instructions which, when executed by processing circuitry, cause the processing circuitry to perform the method for assessing network performance as described earlier and/or the method for training a machine learning model as described earlier. The computer program thus provides the advantages described earlier in respect of the method for assessing network performance and the method for training a machine learning model.

According to another aspect of the disclosure, there is provided a computer program product, embodied on a non-transitory machine-readable medium, comprising instructions which are executable by processing circuitry to cause the processing circuitry to perform the method for assessing network performance as described earlier and/or the method for training a machine learning model as described earlier. The computer program product thus provides the advantages described earlier in respect of the method for assessing network performance and the method for training a machine learning model.

Therefore, advantageous techniques for use in assessing network performance are provided.

BRIEF DESCRIPTION OF THE DRAWINGS

For a better understanding of the techniques, and to show how they may be put into effect, reference will now be made, by way of example, to the accompanying drawings, in which.

DETAILED DESCRIPTION

As mentioned earlier, advantageous techniques for use in assessing network performance are described herein. The network referred to herein can be a fifth generation (5G) network, or any other generation network. In some embodiments, the network referred to herein may be a radio access network (RAN), or any other type of network. The technique described is implemented by a first node and a second node.

Figure 1:
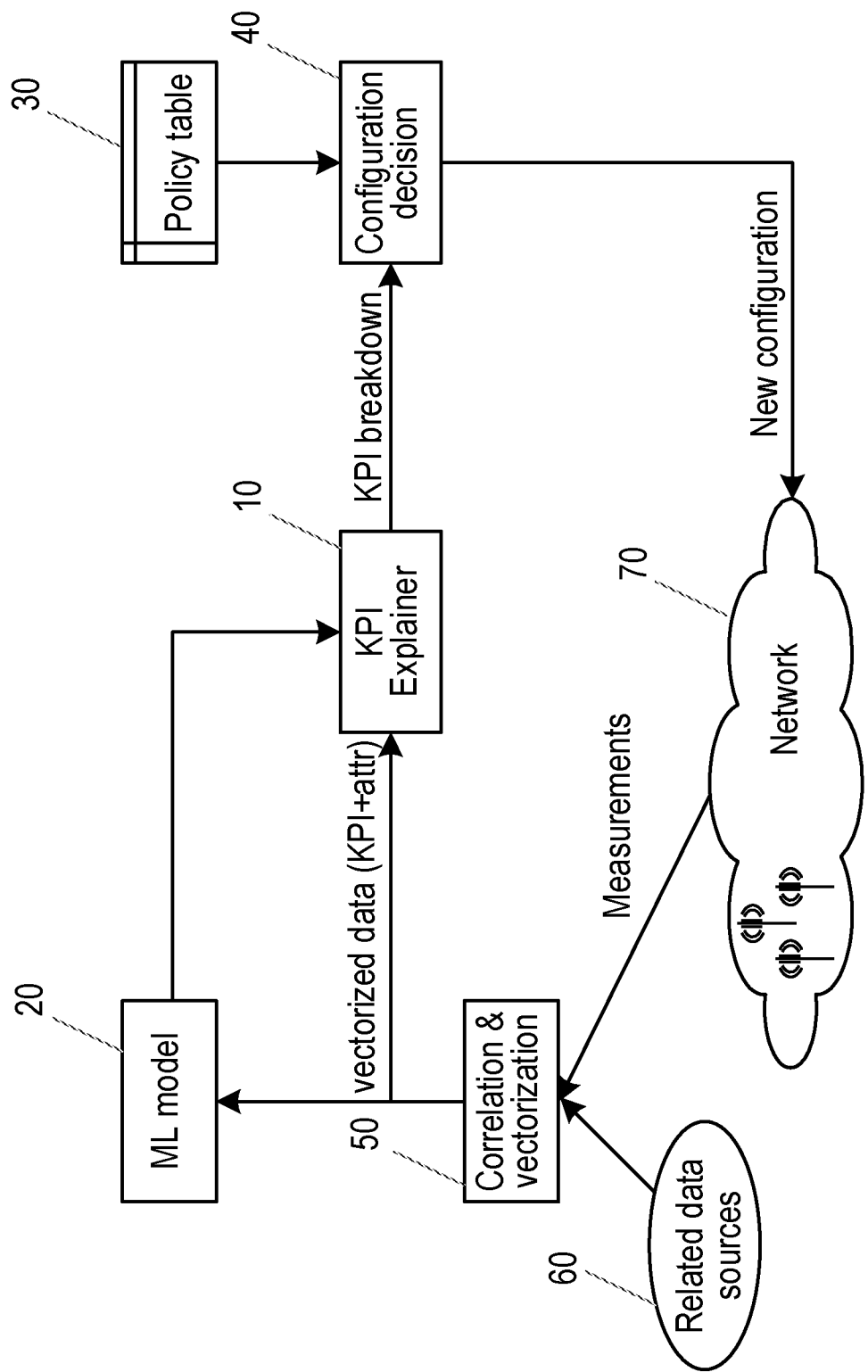
FIG. 1 is a schematic illustrating a system according to an embodiment.

FIG. 1 is a block diagram illustrating a system in accordance with an embodiment. More specifically, FIG. 1 illustrates a system architecture. The system illustrated in FIG. 1 comprises a first node 10 and a second node 20. As illustrated in FIG. 1, the second node 20 is responsible for training a machine learning (ML) model.

The input of the ML model is network measurements indicative of any changes in a network following a change to a configuration of the network and data indicative of one or more factors capable of causing the changes in the network. The one or more factors are independent of the change to the configuration of the network. The first node 10 thus acquires the network measurements and data. The second node 20 also acquires the network measurements and data. The network measurements can be acquired from the network 70. The data can be acquired from related data sources 60. The related data sources can be data sources that are related to the network in that they may have an effect on the performance of the network.

As illustrated in FIG. 1, the system can comprise a third node 50. The third node 50 (or, more specifically, processing circuity of the third node 50) can be configured to correlate and/or vectorize the network measurements and data. Thus, in some embodiments, the network measurements and data acquired by the first node 10 and/or the second node 20 can be in a vectorized form.

The second node 20 uses the acquired network measurements and data as training data. In particular, as will be explained in more detail later, the second node 20 is responsible for training the ML model to predict a key performance indicator (KPI) based on the acquired training data. Thus, the output of the ML model is a KPI. The KPI is a measure of a predicted network performance following a change to a configuration of the network. The first node 10 is responsible for explaining the KPI. Thus, as illustrated in FIG. 1, the first node 10 may also be referred to as a KPI explainer. In some embodiments, the KPI explainer may be a KPI Shapley additive explainer (SHAP). As will be explained in more detail later, the first node 10 is responsible for analysing the acquired network measurements and data to identify a contribution of the one or more factors to a key performance indicator (KPI) and a contribution of the change to the configuration of the network to the KPI.

As illustrated in FIG. 1, in some embodiments, the first node 10 may output the result of the analysis. For example, the first node 10 may initiate transmission of (e.g. itself transmit or cause another node to transmit) the result of the analysis. As illustrated in FIG. 1, in some embodiments, the transmission of the result of the analysis may be initiated towards a fourth node 40. Thus, as illustrated in FIG. 1, the system may comprise a fourth node 40.

The result of the analysis may, for example, be a KPI breakdown. The KPI breakdown can be indicative of the identified contribution of the change to the configuration of the network to the KPI and may also be indictive of the identified contribution of the one or more factors to the KPI. The fourth node 40 (or, more specifically, processing circuity of the fourth node 40) can be configured to take a decision on the configuration of the network based on the result of the analysis performed by the first node 10. In some embodiments, this decision may also be based on one or more policies, e.g. acquired from one or more policy tables 30. As illustrated in FIG. 1, in some embodiments, the fourth node 40 (or, more specifically, processing circuity of the fourth node 40) can be configured to initiate transmission of (e.g. itself transmit or cause another node to transmit) the configuration decision to the network 70.

In some embodiments, any one or more of the nodes of the system illustrated in FIG. 1 can be hardware nodes. However, it will be understood that at least part or all of the node functionality may be virtualized. For example, the functions performed by any one or more of the nodes of the system illustrated in FIG. 1 can be implemented in software running on hardware that is configured to orchestrate the node functionality. Thus, in some embodiments, any one or more nodes of the system illustrated in FIG. 1 can be a virtual node. In some embodiments, any one or more nodes of the system illustrated in FIG. 1 may be realised as cloud-native micro-services.

Figure 2:
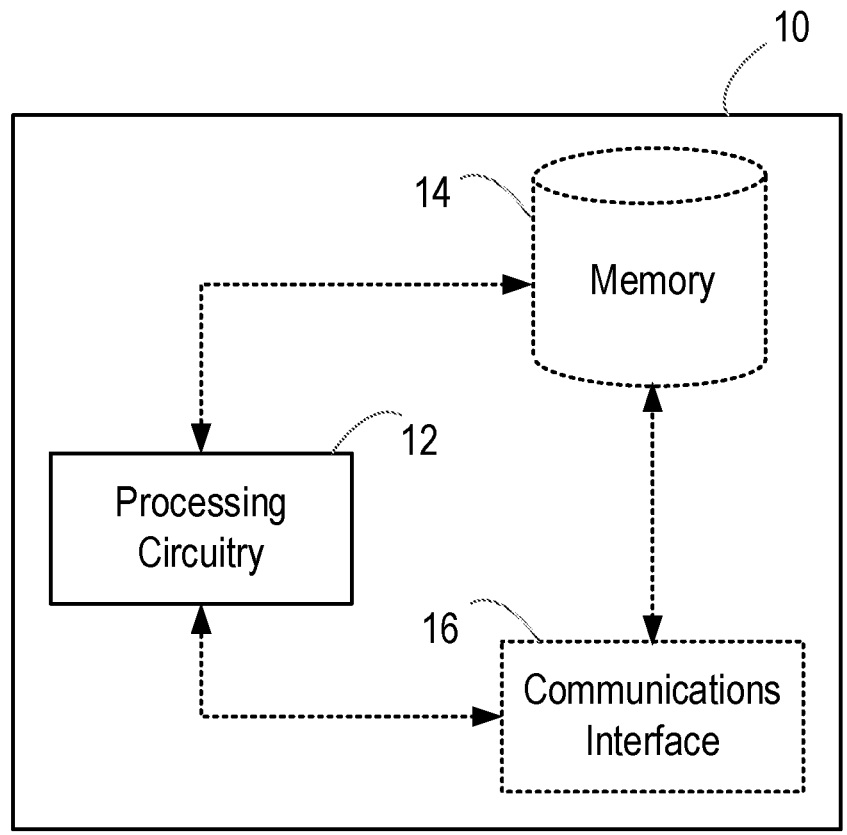
FIG. 2 is a block diagram illustrating a first node according to an embodiment.

FIG. 2 illustrates the first node 10 in accordance with an embodiment. The first node 10 is for assessing network performance. The first node 10 may, for example, be a physical machine (e.g. a server) or a virtual machine (VM).

As illustrated in FIG. 2, the first node 10 comprises processing circuitry (or logic) 12. The processing circuitry 12 controls the operation of the first node 10 and can implement the method described herein in respect of the first node 10. The processing circuitry 12 can be configured or programmed to control the first node 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first node 10. In some embodiments, the processing circuitry 12 can be configured to run software to perform the method described herein in respect of the first node 10. The software may be containerised according to some embodiments. Thus, in some embodiments, the processing circuitry 12 may be configured to run a container to perform the method described herein in respect of the first node 10.

Briefly, the processing circuitry 12 of the first node 10 is configured to acquire network measurements indicative of any changes in a network following a change to a configuration of the network and data indicative of one or more factors capable of causing the changes in the network. The one or more factors are independent of the change to the configuration of the network. The processing circuitry 12 of the first node 10 is configured to analyse the acquired network measurements and data to identify a contribution of the one or more factors to a key performance indicator (KPI) and a contribution of the change to the configuration of the network to the KPI. The KPI is predicted by a machine learning model and is a measure of the network performance following the change to the configuration of the network.

As illustrated in FIG. 2, in some embodiments, the first node 10 may optionally comprise a memory 14. The memory 14 of the first node 10 can comprise a volatile memory or a non-volatile memory. In some embodiments, the memory 14 of the first node 10 may comprise a non-transitory media. Examples of the memory 14 of the first node 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first node 10 can be connected to the memory 14 of the first node 10. In some embodiments, the memory 14 of the first node 10 may be for storing program code or instructions which, when executed by the processing circuitry 12 of the first node 10, cause the first node 10 to operate in the manner described herein in respect of the first node 10. For example, in some embodiments, the memory 14 of the first node 10 may be configured to store program code or instructions that can be executed by the processing circuitry 12 of the first node 10 to cause the first node 10 to operate in accordance with the method described herein in respect of the first node 10. Alternatively or in addition, the memory 14 of the first node 10 can be configured to store any information, data, messages, requests, responses, indications, notifications, signals, or similar, that are described herein. The processing circuitry 12 of the first node 10 may be configured to control the memory 14 of the first node 10 to store information, data, messages, requests, responses, indications, notifications, signals, or similar, that are described herein.

In some embodiments, as illustrated in FIG. 2, the first node 10 may optionally comprise a communications interface 16. The communications interface 16 of the first node 10 can be connected to the processing circuitry 12 of the first node 10 and/or the memory 14 of first node 10. The communications interface 16 of the first node 10 may be operable to allow the processing circuitry 12 of the first node 10 to communicate with the memory 14 of the first node 10 and/or vice versa. Similarly, the communications interface 16 of the first node 10 may be operable to allow the processing circuitry 12 of the first node 10 to communicate with the second node 20 or any other node described herein. The communications interface 16 of the first node 10 can be configured to transmit and/or receive information, data, messages, requests, responses, indications, notifications, signals, or similar, that are described herein. In some embodiments, the processing circuitry 12 of the first node 10 may be configured to control the communications interface 16 of the first node 10 to transmit and/or receive information, data, messages, requests, responses, indications, notifications, signals, or similar, that are described herein.

Although the first node 10 is illustrated in FIG. 2 as comprising a single memory 14, it will be appreciated that the first node 10 may comprise at least one memory (i.e. a single memory or a plurality of memories) 14 that operate in the manner described herein. Similarly, although the first node 10 is illustrated in FIG. 2 as comprising a single communications interface 16, it will be appreciated that the first node 10 may comprise at least one communications interface (i.e. a single communications interface or a plurality of communications interface) 16 that operate in the manner described herein. It will also be appreciated that FIG. 2 only shows the components required to illustrate an embodiment of the first node 10 and, in practical implementations, the first node 10 may comprise additional or alternative components to those shown.

Figure 3:
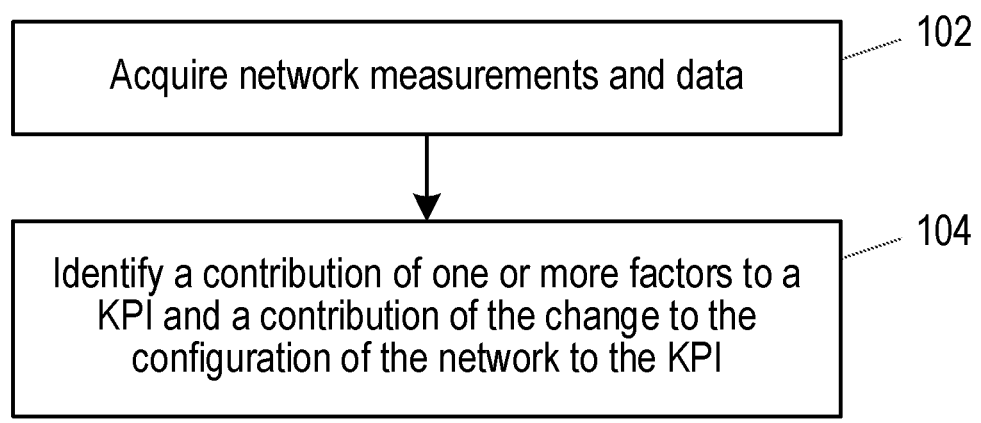
FIG. 3 is a flowchart illustrating a method performed by a first node according to an embodiment.

FIG. 3 is a flowchart illustrating a method performed by the first node 10 in accordance with an embodiment. The method is for assessing network performance. The first node 10 described earlier with reference to FIG. 2 is configured to operate in accordance with the method of FIG. 3. The method can be performed by or under the control of the processing circuitry 12 of the first node 10.

As illustrated at block 102 of FIG. 3, network measurements indicative of any changes in a network following a change to a configuration of the network and data indicative of one or more factors capable of causing the changes in the network is acquired. More specifically, the processing circuitry 12 of the first node 10 acquires the network measurements and data. As mentioned earlier, the one or more factors are independent of the change to the configuration of the network. As illustrated in and as described earlier with reference to FIG. 1, the network measurements may be acquired from the network 70 and the data may be acquired from related data sources 60.

In some embodiments, the network measurements referred to herein may comprise network measurements indicative of any changes in one or more layers of the network. In some embodiments, the network measurements indicative of any changes in the one or more layers of the network may comprise network measurements indicative of any events in the one or more layers of the network. In some embodiments, the one or more layers may comprise a session layer of the network. In some embodiments, the network measurements referred to herein may comprise network measurements on one or more network elements (or nodes).

In some embodiments, the one or more network elements may be one or more network elements in respect of which the change to the configuration of the network is expected to have an impact. Thus, the scope of the network measurements may cover those network elements where the configuration change is expected to make impact according to some embodiments. In some embodiments, the network measurements on the one or more network elements may comprise any one or more network element performance measurements and/or one or more network element event measurements.

In some embodiments, the network measurements referred to herein may comprise network measurements that are performed for a predefined (or certain) duration. In some embodiments, the network measurements may comprise one or more node performance measurement counters, one or more node events, one or more session events, and/or other network metrics. The network measurements used in the method described herein may comprise node counters only according to some embodiments or (more detailed) session level metrics according to other embodiments. The use of session level metrics can improve the efficiency of the methods described herein, e.g. in terms of correlation, machine learning model training, and contribution identification (or KPI explaining).

In some embodiments, the one or more factors referred to herein may comprise any one or more of: one or more configuration changes inside the network, one or more configuration changes outside the network (such as one or more (e.g. traffic and/or performance) measurements from other network domains, such as the core network, RAN, transport network, neighbouring areas, etc.), one or more faults in the network (such as one or more fault management events, e.g. alarms, etc.), one or more service layer descriptors (e.g. one or more KPIs obtained by deep packet inspection (DPI) and/or one or more other sources), one or more data sources outside the network (such as one or more third party data sources, e.g. over-the-top (OTT) service providers, and/or user/session measurements, e.g. user/session radio measurements), a location of one or more user equipments (UEs, e.g. devices) in the network (such as from global positioning systems (GPS) and/or other sources of location information), and/or one or more environmental events (e.g. one or more weather events, mass events, and/or one or more other external events). In addition to the network measurements, the data indicative of the one or more factors capable of causing the changes in the network can account for further related data sources that may have impacted the predicted KPI independently of the configuration change. In this way, the configuration (or feature impact) analysis described herein can be more detailed and accurate. As such, it may cover a wide range of additional information.

Returning back to FIG. 3, as illustrated at block 104, the acquired network measurements and data are analysed to identify a contribution of the one or more factors to a key performance indicator (KPI) and a contribution of the change to the configuration of the network to the KPI. More specifically, the processing circuitry 12 of the first node 10 performs this analysis. The KPI is predicted by a machine learning model (which is trained by the second node 20) and is a measure of the network performance following the change to the configuration of the network. The predicted KPI can be a value, e.g. an integer.

Thus, it is possible to separate the impact of the changed configuration of the network from the impacts of other factors, such as the varying environment and/or other noise effects. This is made possible by using an extended set of measurements, which comprises the one or more factors, which are independent of the change to the configuration of the network, but which are capable of causing changes in the network. The one or more factors can be any one or more factors that may potentially have impacted the predicted KPI.

A person skilled in the art will be aware of various techniques and, in particular, various machine learning (ML) and artificial intelligence (AI) techniques, that can be used to identify a contribution of one or more features (which, in the present disclosure comprise the one or more factors and the change to the configuration of the network) to an output of a machine learning model (which, in the present disclosure, is the KPI). An example of such a technique that can be used is the Shapley additive explanations (SHAP) technique, which is well known in the art of ML and AI for explaining the output of an ML model. Although the SHAP technique is mentioned as an example, it will be understood that other techniques can also be used.

In some embodiments, the analysis of the acquired network measurements and data can be a feature impact analysis, such as a machine learning based feature impact analysis. For example, in some embodiments, the analysis of the acquired network measurements and data may be an additive feature impact analysis, such as a machine learning based additive feature impact analysis, e.g. as used in the above-mentioned SHAP technique. In an additive feature impact analysis, the individual contributions advantageously add up to the KPI change. Thus, a (e.g. additive) feature impact analysis may be applied to the predicted KPI according to some embodiments.

As is known in the art of machine learning, feature impact analysis can be used to identify which features in a dataset have the greatest effect on the outcomes of a machine learning model. Here, the dataset is the one or more factors and the change to the configuration of the network, and the outcome of the machine learning model is the KPI. Thus, the one or more factors and the change to the configuration of the network can also be referred to herein as features. A feature impact analysis can identify whether the one or more factors or the change to the configuration of the network has the greatest effect on the KPI. The contribution of the one or more factors to the predicted KPI referred to herein can be a measure of an impact that the one or more factors had on the predicted KPI. Similarly, the contribution of the change to the configuration of the network to the predicted KPI referred to herein can be a measure of an impact that the change to the configuration of the network had on the predicted KPI.

It is thus possible to estimate the effect of the configuration change on the network and separate it from other influencing factors. The expected impact of the configuration change on the network can be estimated independently of other factors, such as environmental disturbances and noise. That is, the actual impact of the configuration change can be determined and the impacts caused by the variability of other factors (such as environmental impacts and noise) can be excluded. The contribution of the one or more factors and/or the contribution of the change to the configuration of the network can be a quantitative measure. A contribution may also be referred to in the art as an impact or an importance. In some embodiments, the contribution of the one or more factors and/or the contribution of the change to the configuration of the network may be expressed as a value, e.g. a percentage value. In some embodiments, the contribution of the change to the configuration of the network can be used for optimally scaling a subsequent configuration change to the network, e.g. in forthcoming (e.g. iterative) steps.

In some embodiments, the method may comprise filtering out (or excluding) the contribution of the one or more factors to the KPI to identify the contribution of the change to the configuration of the network to the KPI. More specifically, the processing circuitry 12 of the first node 10 may be configured to perform this filtering. Thus, the actual impact of the applied configuration changes can be determined and the impacts caused by the variability of other factors, e.g. environmental impacts and/or noise, can be excluded. In this way, the accuracy of impact assessment can be significantly improved and further applications can be enabled by way of the method described with reference to FIG. 3. The method can be related to iterative self-organising network (SON) optimisation algorithms.

Although not illustrated in FIG. 3, in some embodiments, the method may comprise comparing the predicted KPI to a reference KPI to identify a difference. More specifically, the processing circuitry 12 of the first node 10 may be configured to perform the comparison. The reference KPI can be a measure of the network performance prior to the change to the configuration of the network. In some embodiments, the reference KPI may also be predicted by the machine learning model. In some embodiments, the difference may be indicative of the contribution of the one or more factors and the change to the configuration of the network to the KPI. In some embodiments, the contribution of the one or more factors to the KPI may be the contribution of the one or more factors to the difference and the contribution of the change to the configuration of the network to the KPI may be the contribution of the change to the configuration of the network to the difference. In some embodiments, the method may comprise, for each of the one or more factors, identifying the contribution of that factor to the difference and/or identifying an average of the contribution of the one or more factors to the difference.

In an example, in order to determine the effect of a configuration change in a current iteration $C^{(t)}$ compared to a reference configuration $C_{Ref}$, a predicted KPI value is compared to a reference KPI value, i.e. $KPI^{(t)}$ is compared to $KPI^{(ref)}$. Based on the difference in the KPI values, the first node 10 can assess the impact of the applied configuration $C^{(t)}$. The predicted KPI may be variable and noisy, which can lead to false conclusions regarding the applied configuration impact. However, by way of the method performed by the first node 10 described herein, this uncertainty is reduced or even removed by extending the predicted KPI value (e.g. for each individual data vector) with a breakdown of the impact of its feature values, such as an additive breakdown of the impact of its feature values.

In order to see the KPI change caused by the configuration change, the reference dataset for the first node 10 is chosen as a dataset with a reference configuration (e.g. a configuration before the change to the configuration), while the evaluation dataset is the current input with the new configuration following the configuration change. The output of this function for each data vector (indexed by k) is the difference of the predicted KPI value $KPI_k^{(t)}$ from the average reference KPI value $KPI_{avg}^{(ref)}$, broken down to the impact $I_{j,k}^{(t)}$ of individual features including the configuration parameters:

$$KPI_k^{(t)} - KPI_{avg}^{(ref)} = \Delta KPI_k^{(t)} = I_{1,k}^{(t)} + I_{2,k}^{(t)} + I_{3,k}^{(t)} + \ldots + I_{n,k}^{(t)}.$$

The individual feature impacts $I_{j,k}^{(t)}$ explain the contribution of a given feature value to the KPI. For the evaluated period, these individual feature values can be aggregated in an average value, which yields an average impact of the features, some of which are the configuration parameters under evaluation. Thus, the method can consider the effect of a feature relative to the average effect of all features. The KPI change, as well as the individual impacts can be negative or positive. Thus, a positive change in the KPI may be accompanied by a negative impact from the observed configuration feature. It can be determined whether the effect of the observed configuration feature is pushing the KPI over the average with a positive effect or pulling the KPI below the average with a negative effect. These effects can also be regarded as a force, which not only has a direction but also a quantified strength. With this analysis, an order of importance can be created for the features or single input vectors can be analysed. It is possible to calculate feature importance values compared to a reference dataset or averages of the same dataset.

Figure 4:
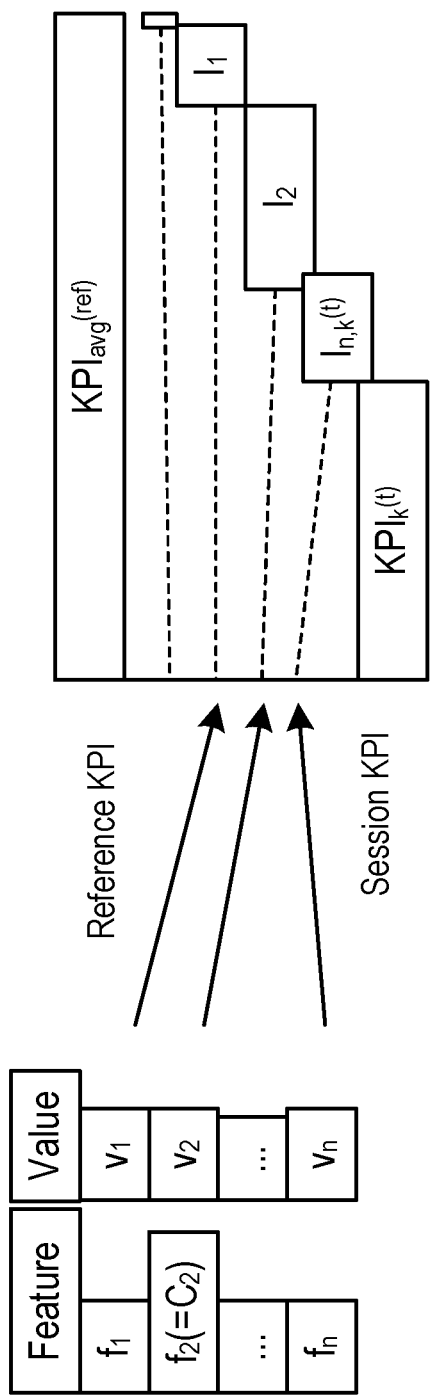
FIG. 4 is an example breakdown of the contributions to a key performance indicator.

FIG. 4 illustrates an example breakdown of the contributions to a KPI. More specifically, FIG. 4 illustrates an additive feature impact breakdown. The features comprise $f_1, f_2 \ldots f_n$ and have values $v_1, v_2 \ldots v_n$ respectively. The features $f_1$ and $f_n$ each correspond to a factor capable of causing changes in the network, which is independent of the change to the configuration of the network. The feature $f_2$ corresponds to the change to the configuration of the network, $C_2$. The predicted KPI value $KPI_k^{(t)}$ value is compared to the average reference KPI value $KPI_{avg}^{(ref)}$ to identify a difference, which is indicative of the contribution of the one or more factors and the change to the configuration of the network to the predicted KPI value $KPI_k^{(t)}$ value. In this example, the contribution is shown as a feature impact or, more specifically, a breakdown of the individual feature impacts $I_1, I_2, I_{n,k}^{(t)}$ for each of the features $f_1, f_2, f_n$. In this example, the configuration $C_2$ has a negative impact $I_2$ on the predicted KPI.

As mentioned earlier, in some embodiments, the first node 10 (or more specifically, the processing circuitry 12 of the first node 10) can be configured to output the result of the analysis. For example, the first node 10 (or more specifically, the processing circuitry 12 of the first node 10) may be configured to initiate transmission of (e.g. itself transmit via a communications interface 16 of the first node 10 or cause another node to transmit) the result of the analysis. As mentioned earlier, the result of the analysis may, for example, be a KPI breakdown, such as that illustrated in FIG. 4. The KPI breakdown can be indicative of the identified contribution of the change to the configuration of the network to the KPI and may also be indictive of the identified contribution of the one or more factors to the KPI. Thus, the description of the KPI can be extended with further information about individual contributions, e.g. individual feature impacts.

Although also not illustrated in FIG. 3, in some embodiments, the method may comprise determining whether to maintain the change to the configuration of the network based on the contribution of the change to the configuration of the network to the KPI. More specifically, in some embodiments, the processing circuitry 12 of the first node 10 may be configured to determine whether to maintain the change to the configuration of the network. In other embodiments, the fourth node 40 of the system illustrated in FIG. 1 may perform the function of determining whether to maintain the change to the configuration of the network. Thus, a decision can be taken on the configuration of the network based on the result of the analysis performed by the first node 10. In some embodiments, determining whether to maintain the change to the configuration of the network may comprise determining whether the change to the configuration of the network is an improvement, based on the KPI and the contribution of the change to the configuration of the network to the KPI. In these embodiments, it may be determined that the change is to be maintained if the change to the configuration of the network is determined to be an improvement.

In an example, the KPI may be a voice Mean Opinion Score (MOS), which rates a voice quality between 1 to 5. In this example, it may appear that the change to the configuration of the network improved the KPI from 4 to 4.5, i.e. an improvement of 0.5. However, the analysis of the acquired network measurements and data as described herein may identify that it is not only the change to the configuration of the network that contributed to the change to the KPI but that one or more other factors also contributed to the change to the KPI. For example, the analysis may identify an increase of 0.6 as the contribution of the one or more other factors (e.g. a lower traffic demand) to the KPI and a decrease of 0.1 as the contribution of the change to the configuration of the network to the KPI. In this example, the change to the configuration of the network is determined not to be an improvement and thus the change to the configuration of the network is not maintained. For example, the configuration of the network may be reverted back to the configuration it had prior to the configuration change. The improvement to the KPI in this example is due to one or more other factors, rather than the change to the configuration of the network.

In some embodiments, the method described herein may be performed for a plurality of different changes to the configuration of the network. In some embodiments, the method may comprise comparing the contributions of the different changes to the configuration of the network to the respective KPIs. Thus, the method can be performed for comparable effects of each input on the machine learning model prediction or, more specifically, each configuration change on the KPI prediction. In some embodiments, multiple configuration changes may be analysed at the same time. If the contribution of each change to the configuration of the network is identified, the individual contributions can be compared to one another. In this way, it is possible to prioritise the different changes to the configuration of the network.

In some embodiments, the method may comprise selecting one of the plurality of different changes to the configuration of the network based on the comparison of the contributions of the different changes to the configuration of the network to the respective KPIs. In some embodiments, the method can be an iterative method for optimising the configuration of the network, e.g. for optimising network configuration parameters. For example, given a KPI breakdown, an appropriate configuration policy may be selected for the next iteration cycle. In this selection, the feature impact from the configuration parameter $I_{j,avg}^{(t)}$ is more descriptive about the impact of the configuration change than the original $\Delta KPI_{avg}^{(t)}$, because the additional noise and variability caused by other factors is already filtered out. The selected configuration can then be applied in the network for the next evaluation cycle.

Figure 5:
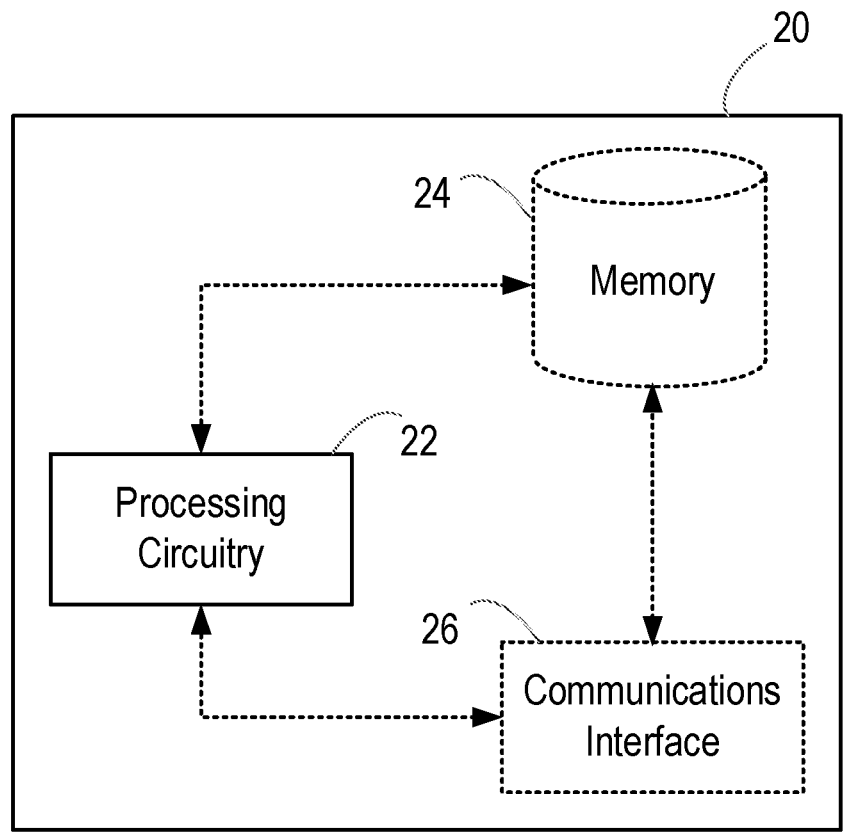
FIG. 5 is a block diagram illustrating a second node according to an embodiment.

FIG. 5 illustrates the second node 20 in accordance with an embodiment. The second node 20 is for training a machine learning model to predict a KPI for use in assessing network performance. The second node 20 may, for example, be a physical machine (e.g. a server) or a virtual machine (VM).

As illustrated in FIG. 5, the second node 20 comprises processing circuitry (or logic) 22. The processing circuitry 22 controls the operation of the second node 20 and can implement the method described herein in respect of the second node 20. The processing circuitry 22 can be configured or programmed to control the second node 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the second node 20. In some embodiments, the processing circuitry 22 can be configured to run software to perform the method described herein in respect of the second node 20. The software may be containerised according to some embodiments. Thus, in some embodiments, the processing circuitry 22 may be configured to run a container to perform the method described herein in respect of the second node 20.

Briefly, the processing circuitry 22 of the second node 20 is configured to acquire training data comprising network measurements indicative of any changes in a network following a change to a configuration of the network and data indicative of one or more factors capable of causing the changes in the network. The one or more factors are independent of the change to the configuration of the network. The processing circuitry 22 of the second node 20 is configured to train the machine learning model to predict a KPI based on the acquired training data. The KPI is a measure of a predicted network performance following a change to a configuration of the network.

As illustrated in FIG. 5, in some embodiments, the second node 20 may optionally comprise a memory 24. The memory 24 of the second node 20 can comprise a volatile memory or a non-volatile memory. In some embodiments, the memory 24 of the second node 20 may comprise a non-transitory media. Examples of the memory 24 of the second node 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the second node 20 can be connected to the memory 24 of the second node 20. In some embodiments, the memory 24 of the second node 20 may be for storing program code or instructions which, when executed by the processing circuitry 22 of the second node 20, cause the second node 20 to operate in the manner described herein in respect of the second node 20. For example, in some embodiments, the memory 24 of the second node 20 may be configured to store program code or instructions that can be executed by the processing circuitry 22 of the second node 20 to cause the second node 20 to operate in accordance with the method described herein in respect of the second node 20. Alternatively or in addition, the memory 24 of the second node 20 can be configured to store any information, data, messages, requests, responses, indications, notifications, signals, or similar, that are described herein. The processing circuitry 22 of the second node 20 may be configured to control the memory 24 of the second node 20 to store information, data, messages, requests, responses, indications, notifications, signals, or similar, that are described herein.

In some embodiments, as illustrated in FIG. 5, the second node 20 may optionally comprise a communications interface 26. The communications interface 26 of the second node 20 can be connected to the processing circuitry 22 of the second node 20 and/or the memory 24 of second node 20. The communications interface 26 of the second node 20 may be operable to allow the processing circuitry 22 of the second node 20 to communicate with the memory 24 of the second node 20 and/or vice versa. Similarly, the communications interface 26 of the second node 20 may be operable to allow the processing circuitry 22 of the second node 20 to communicate with the first node 10 or any other node described herein. The communications interface 26 of the second node 20 can be configured to transmit and/or receive information, data, messages, requests, responses, indications, notifications, signals, or similar, that are described herein. In some embodiments, the processing circuitry 22 of the second node 20 may be configured to control the communications interface 26 of the second node 20 to transmit and/or receive information, data, messages, requests, responses, indications, notifications, signals, or similar, that are described herein.

Although the second node 20 is illustrated in FIG. 5 as comprising a single memory 24, it will be appreciated that the second node 20 may comprise at least one memory (i.e. a single memory or a plurality of memories) 24 that operate in the manner described herein. Similarly, although the second node 20 is illustrated in FIG. 5 as comprising a single communications interface 26, it will be appreciated that the second node 20 may comprise at least one communications interface (i.e. a single communications interface or a plurality of communications interface) 26 that operate in the manner described herein. It will also be appreciated that FIG. 5 only shows the components required to illustrate an embodiment of the second node 20 and, in practical implementations, the second node 20 may comprise additional or alternative components to those shown.

Figure 6:
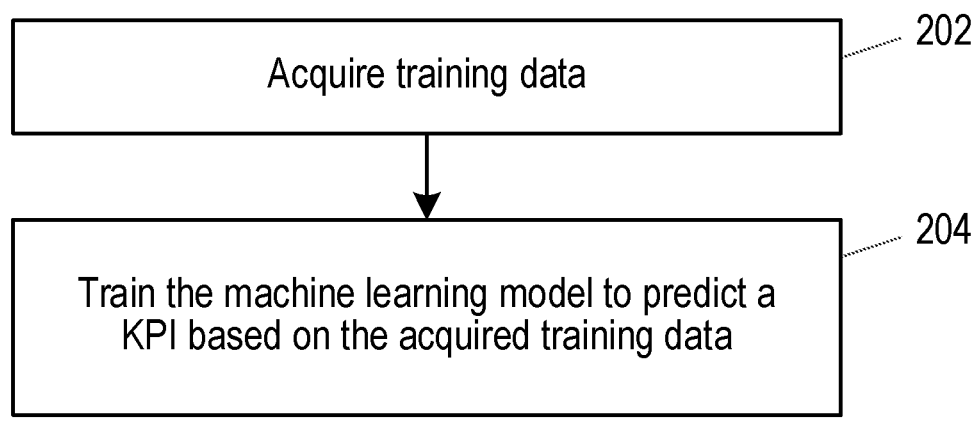
FIG. 6 is a flowchart illustrating a method performed by a second node according to an embodiment.

FIG. 6 is a flowchart illustrating a method performed by the second node 20 in accordance with an embodiment. The method is for training a machine learning model to predict a KPI for use in assessing network performance. The second node 20 described earlier with reference to FIG. 5 is configured to operate in accordance with the method of FIG. 6. The method can be performed by or under the control of the processing circuitry 22 of the second node 20.

As illustrated at block 202 of FIG. 6, training data comprising network measurements indicative of any changes in a network following a change to a configuration of the network and data indicative of one or more factors capable of causing the changes in the network is acquired. More specifically, the processing circuitry 22 of the second node 20 acquires the training data. The one or more factors are independent of the change to the configuration of the network. In some embodiments, the training data may be acquired continuously or iteratively.

As mentioned earlier, in some embodiments, the network measurements referred to herein may comprise network measurements indicative of any changes in one or more layers of the network. In some embodiments, the network measurements indicative of any changes in the one or more layers of the network may comprise network measurements indicative of any events in the one or more layers of the network. In some embodiments, the one or more layers may comprise a session layer of the network. In some embodiments, the network measurements referred to herein may comprise network measurements on one or more network elements.

In some embodiments, the one or more network elements may be one or more network elements (or nodes) in respect of which the change to the configuration of the network is expected to have an impact. Thus, the scope of the network measurements may cover those network elements where the configuration change is expected to make impact according to some embodiments. In some embodiments, the network measurements on the one or more network elements may comprise any one or more network element performance measurements and/or one or more network element event measurements. Although measurements from other network areas may not be required for the specific goal directly, these measurements may be useful indirectly as a general input for building a more complete and more reliable machine learning model.

As mentioned earlier, in some embodiments, the one or more factors referred to herein may comprise any one or more of one or more configuration changes inside the network, one or more configuration changes outside the network (such as one or more (e.g. traffic and/or performance) measurements from other network domains, such as the core network, RAN, transport network, neighbouring areas, etc.), one or more faults in the network (such as one or more fault management events, e.g. alarms, etc.), one or more service layer descriptors (e.g. one or more KPIs obtained by deep packet inspection (DPI) and/or one or more other sources), one or more data sources outside the network (such as one or more third party data sources, e.g. over-the-top (OTT) service providers, and/or user/session measurements, e.g. user/session radio measurements), a location of one or more user equipments (UEs, e.g. devices) in the network (such as from global positioning systems (GPS) and/or other sources of location information), and/or one or more environmental events (e.g. one or more weather events, mass events, and/or one or more other external events).

In some embodiments, the training data may be a correlated and/or vectorized set of training data. That is, in some embodiments, a correlated and/or vectorized input set may be built using the training data. In some embodiments, correlation and/or vectorization of the data sources from which the data indicative of the one or more factors referred to herein is acquired may be based on identifiers (IDs) from different network layers (e.g. one or more cell IDs, one or more node IDs, one or more temporary session IDs, one or more international mobile subscriber identities (IMSIs), one or more internet protocol (IP) addresses, and/or any other identifiers), other attributes (e.g. geographical location) and time/duration matching. The resulting data vector may include fields containing the KPI governing the next set of proposed configuration changes, as well as all the correlated factors that are potentially impacting the KPI. The set of vectors indexed by k with the KPI and features $f_i$ in iteration t can be denoted as $\{KPI, f_1, f_2, \ldots f_n\}_k^{(t)}$. Here, some of the features correspond to the configuration change under evaluation. The set of vectors (or the vectorized dataset) can be used for building the machine learning model, which infers a KPI value from the feature values. For the sake of simplicity, the method is described herein in respect of one KPI. However, it will be appreciated that the method can easily be extended to multiple KPIs.

Returning back to FIG. 6, as illustrated at block 204, the machine learning model is trained to predict a KPI (or KPI changes) based on the acquired training data. More specifically, the processing circuitry 22 of the second node 20 trains the machine learning model. As mentioned earlier, the KPI is a measure of a predicted network performance following a change to a configuration of the network. In terms of the training data, the machine learning model can be constructed in multiple possible ways. In some embodiments, all historically acquired training data may be used to build the model.

Although not illustrated in FIG. 6, in some embodiments, the method may comprise retraining the machine learning model based on updated training data. More specifically, the processing circuitry 22 of the second node 20 may be configured to retrain the machine learning model. For example, in some embodiments, where the training data is acquired continuously or iteratively (e.g. in batches), the machine learning model can be re-trained completely in every iteration. In other embodiments, online and/or incremental learning techniques can be used to retrain the machine learning model at predefined time intervals (e.g. from time to time). In some embodiments, if a latest iteration involves a network configuration change that is new (e.g. previously unseen) and/or that contains undiscovered feature impacts, a new dataset (comprising the network measurements and data mentioned earlier) associated with this network configuration change may be used to retrain the machine learning model. This retrained machine learning model can then be the basis for the (e.g. feature impact) analysis described earlier. In other embodiments, the machine learning model may be used without having to retrain it with the latest dataset.

The machine learning model may be trained using any suitable machine learning technique, such as decision tree-based machine learning techniques (e.g. Decision Tree, Random Forest, Boosted Trees, etc.), deep learning algorithms, or any other suitable machine learning technique.

In some embodiments, the increased accuracy of contribution (or impact) analysis method described herein can be built upon and a smaller scope may be applied for network measurement cycles over time. If a network measurement duration is small enough, the method described herein can be used to adapt the network to fast paced changes in the environment, e.g. adapt to changing traffic levels or unexpected events, like cell outages. In this way, using a KPI enhanced with the contribution analysis described herein can be the enabler for many real-time SON algorithms.

In some embodiments, the contribution (or impact) analysis method described herein may be used to extend KPIs with the corresponding contributions to that KPI to assess what environment (described by the one or more factors) is required for a certain configuration to be most effective or least effective (or counter effective). It is then possible to observe the network state and/or make predictions for the influencing factor(s) for the measurement cycle and take it as an additional input in the configuration decision to select the most effective configuration parameter(s).

In an example, the contribution (or impact) analysis method described herein may be applied in radio cell coverage optimisation. In this example, the change to the configuration of the network may be a remote electrical tilt. The predicted KPIs may include a bearer drop ratio, a handover success ratio, an inter-cell interference level, an uplink signal strength, a downlink signal strength, and/or a signal quality measure. For a change to the configuration of the network comprising an up-tilt, one may expect increased interference, higher coverage, etc. However, the predicted KPIs can be impacted by many other factors, e.g., daily traffic level variations, geographically changed device distribution (such as more active devices in a cell-edge area), increased activity of a faulty terminal type in the area, etc. By breaking down the contributions of these factors and the change to the configuration to the predicted KPI (i.e. by breaking down the KPI impacts), it may turn out that in aggregate a KPI degradation was observed. However, the contribution analysis may show that the up-tilt impact on the KPI is actually an improvement, and this improvement is simply offset by unusual cell edge activity of faulty terminal types. Thus, in this example, the change to the configuration of the network may be kept. The identified cause of the observed KPI degradation may be handled separately.

Figure 7:
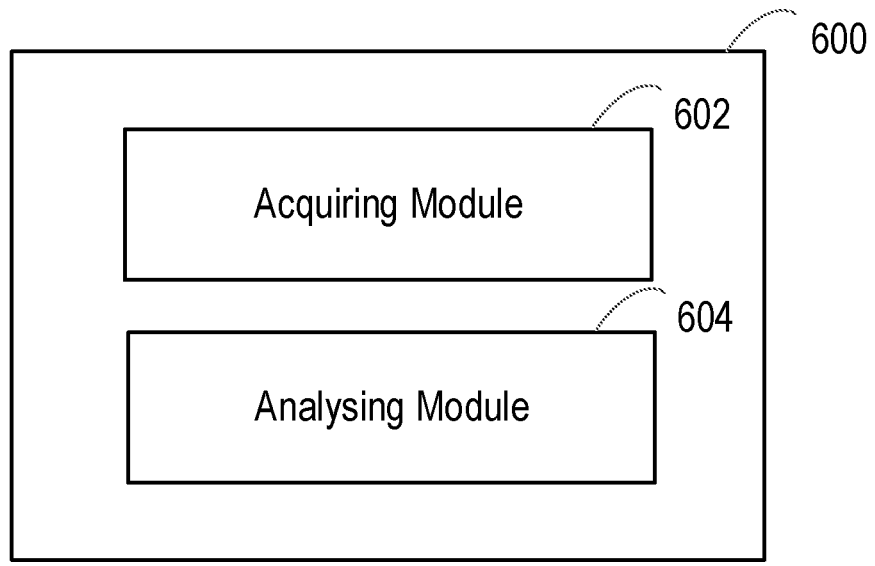
FIG. 7 is a block diagram illustrating a first node according to an embodiment.

FIG. 7 is a block diagram illustrating a first node 600 in accordance with an embodiment. The first node 600 comprises an acquiring module 602 configured to acquire network measurements indicative of any changes in a network following a change to a configuration of the network and data indicative of one or more factors capable of causing the changes in the network. The one or more factors are independent of the change to the configuration of the network. The first node 600 also comprises an analysing module 604 configured to analyse the acquired network measurements and data to identify a contribution of the one or more factors to a key performance indicator (KPI) and a contribution of the change to the configuration of the network to the KPI. The KPI is predicted by a machine learning model and is a measure of the network performance following the change to the configuration of the network. The first node 600 may operate in the manner described herein in respect of the first node.

Figure 8:
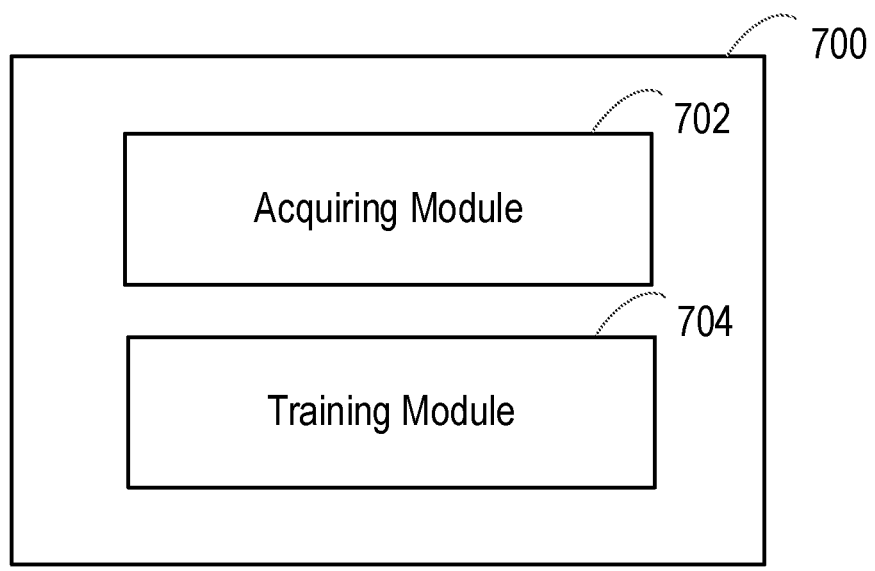
FIG. 8 is a block diagram illustrating a second node according to an embodiment.

FIG. 8 is a block diagram illustrating a second node 700 in accordance with an embodiment. The second node 700 comprises an acquiring module 702 configured to acquire training data comprising network measurements indicative of any changes in a network following a change to a configuration of the network and data indicative of one or more factors capable of causing the changes in the network. The one or more factors are independent of the change to the configuration of the network. The second node 700 also comprises a training module 704 configured to train the machine learning model to predict a KPI based on the acquired training data. The KPI is a measure of a predicted network performance following a change to a configuration of the network. The second node 700 may operate in the manner described herein in respect of the second node.

There is also provided a computer program comprising instructions which, when executed by processing circuitry (such as the processing circuitry 12 of the first node 10 described earlier and/or the processing circuitry 22 of the second node 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the first node 10 described earlier and/or the processing circuitry 22 of the second node 20 described earlier) to cause the processing circuitry to perform at least part of the method described herein. There is provided a computer program product comprising a carrier containing instructions for causing processing circuitry (such as the processing circuitry 12 of the first node 10 described earlier and/or the processing circuitry 22 of the second node 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first node functionality, the second node functionality, and/or any other node functionality described herein can be performed by hardware. Thus, in some embodiments, the first node 10, the second node 20, and/or any other node described herein can be a hardware node. However, it will also be understood that optionally at least part or all of the first node functionality, the second node functionality, and/or any other node functionality described herein can be virtualized. For example, the functions performed by the first node 10, the second node 20, and/or any other node described herein can be implemented in software running on generic hardware that is configured to orchestrate the node functionality. Thus, in some embodiments, the first node 10, the second node 20, and/or any other node described herein can be a virtual node. In some embodiments, at least part or all of the first node functionality, the second node functionality, and/or any other node functionality described herein may be performed in a network enabled cloud. The first node functionality, the second node functionality, and/or any other node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided techniques for use in assessing network performance.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for assessing network performance, the method comprising:
    acquiring network measurements indicative of any changes in a network following a change to a configuration of the network and data indicative of one or more factors capable of causing the changes in the network, the one or more factors being independent of the change to the configuration of the network, wherein the change to the configuration of the network comprises a remote electrical tilt;
    analysing the acquired network measurements and data to identify a contribution of the one or more factors to a key performance indicator, KPI, and a contribution of the change to the configuration of the network to the KPI, wherein the KPI comprises:
        a bearer drop ratio;
        a handover success ratio;
        an inter-cell interference level;
        an uplink signal strength;
        a downlink signal strength; or
        a signal quality measure;
    the KPI being predicted by a machine learning model and is a measure of the network performance following the change to the configuration of the network, wherein the machine learning model receives as input the network measurements and the data; and
    comparing the predicted KPI to a reference KPI to identify a difference, wherein:

the difference is indicative of the contribution of the one or more factors and the change to the configuration of the network to the KPI;
the contribution of the one or more factors to the KPI is the contribution of the one or more factors to the difference;
the contribution of the change to the configuration of the network to the KPI is the contribution of the change to the configuration of the network to the difference; and
for each of the one or more factors, identifying the contribution of that factor to the difference,
wherein the one or more factors comprise any one or more of:
one or more configuration changes outside the network;
one or more faults in the network;
one or more service layer descriptors;
one or more data sources outside the network;
a location of one or more user equipments in the network; and
one or more environmental events; and
wherein the data indicative of the one or more factors comprises data other than:
a bearer drop ratio;
a handover success ratio;
an inter-cell interference level;
an uplink signal strength;
a downlink signal strength; and
a signal quality measure.

2. The method according to claim 1, further comprising:
determining whether to maintain the change to the configuration of the network based on the contribution of the change to the configuration of the network to the KPI.

3. The method according to claim 2, wherein:
determining whether to maintain the change to the configuration of the network comprises:
determining whether the change to the configuration of the network is an improvement based on the KPI and contribution of the change to the configuration of the network to the KPI; and
determining that the change is to be maintained if the change to the configuration of the network is determined to be an improvement.

4. The method according to claim 1, further comprising identifying an average of the contribution of the one or more factors to the difference; and
comparing the average of the contribution of the one or more factors to the difference to the contribution of the one or more factors to the difference.

5. The method according to claim 1, the method further comprising:
filtering out the contribution of the one or more factors to the KPI to identify the contribution of the change to the configuration of the network to the KPI.

6. The method according to claim 1, comprising:
performing the method for a plurality of different changes to the configuration of the network.

7. The method according to claim 6, further comprising:
comparing the contributions of the different changes to the configuration of the network to the respective KPIs.

8. The method according to claim 7, further comprising:
selecting one of the plurality of different changes to the configuration of the network based on the comparison.

9. The method according to claim 1, wherein:
the network measurements comprise network measurements indicative of any changes in one or more layers of the network.

10. The method according to claim 9, wherein:
the network measurements indicative of any changes in the one or more layers of the network comprise network measurements indicative of any events in the one or more layers of the network.

11. The method according to claim 9, wherein:
the one or more layers comprises a session layer of the network.

12. The method as claimed in claim 1, wherein:
the network measurements comprise network measurements on one or more network elements.

13. The method according to claim 12, wherein:
the one or more network elements are one or more network elements in respect of which the change to the configuration of the network is expected to have an impact.

14. The method according to claim 12, wherein:
the network measurements on the one or more network elements comprise any one or more network element performance measurements and one or more network element event measurements.

15. The method as claimed in according to claim 1, wherein:
the one or more factors further comprise any one or more of:
one or more configuration changes outside the network;
one or more data sources outside the network; and
one or more environmental events.

16. A first node, comprising:
processing circuitry configured to operate:
acquire network measurements indicative of any changes in a network following a change to a configuration of the network and data indicative of one or more factors capable of causing the changes in the network, the one or more factors being independent of the change to the configuration of the network, wherein the change to the configuration of the network comprises a remote electrical tilt;:
analyse the acquired network measurements and data to identify a contribution of the one or more factors to a key performance indicator, KPI, and a contribution of the change to the configuration of the network to the KPI, wherein the KPI comprises:
a bearer drop ratio;
a handover success ratio;
an inter-cell interference level;
an uplink signal strength;
a downlink signal strength; or
a signal quality measure;
the KPI being predicted by a machine learning model and is a measure of the network performance following the change to the configuration of the network, and
compare the predicted KPI to a reference KPI to identify a difference, wherein:
the difference is indicative of the contribution of the one or more factors and the change to the configuration of the network to the KPI;
the contribution of the one or more factors to the KPI is the contribution of the one or more factors to the difference;

the contribution of the change to the configuration of the network to the KPI is the contribution of the change to the configuration of the network to the difference; and for each of the one or more factors, identifying the contribution of that factor to the difference, wherein the one or more factors comprise any one or more of:
one or more configuration changes outside the network;
one or more faults in the network;
one or more service layer descriptors;
one or more data sources outside the network;
a location of one or more user equipments in the network; and
one or more environmental events, and wherein the data indicative of the one or more factors comprises data other than:
a bearer drop ratio;
a handover success ratio;
an inter-cell interference level;
an uplink signal strength;
a downlink signal strength; and
a signal quality measure.

17. The first node according to claim 16, wherein:
the first node further comprises:
at least one memory storing instructions which, when executed by the processing circuitry, cause the processing circuitry to perform the acquiring and the analysing.

18. The method according to claim 1, further comprising:
acquiring training data comprising the network measurements indicative of any changes in the network following the change to the configuration of the network and the data indicative of one or more factors capable of causing the changes in the network; and
training the machine learning model to predict the KPI based on the acquired training data.

19. The method according to claim 18, wherein:
the training data is acquired continuously or iteratively.

20. The method according to claim 18, further comprising retraining the machine learning model based on updated training data.

21. The method according to claim 18, wherein:
the training data is a vectorized set of training data.

22. The method according to claim 18, wherein:
the network measurements comprise network measurements indicative of any changes in one or more layers of the network.

23. The method according to claim 22, wherein:
the network measurements indicative of any changes in the one or more layers of the network comprise network measurements indicative of any events in the one or more layers of the network.

24. The method according to claim 22, wherein:
the one or more layers comprises a session layer of the network.

25. The method according to claim 22, wherein:
the network measurements comprise network measurements on one or more network elements.

26. The method according to claim 25, wherein:
the one or more network elements are one or more network elements in respect of which the change to the configuration of the network is expected to have an impact.

27. The method according to claim 25, wherein:
the network measurements on the one or more network elements comprise one or both of:
any one or more network element performance measurements; and
one or more network element event measurements.

28. The method according to claim 18, wherein:
the one or more factors comprise one or more service layer descriptors, wherein one or more KPIs are obtained by deep packet inspection.

29. The method according to claim 1, wherein the network measurements are acquired from the network and the data is acquired from one or more data sources outside the network.

30. The method according to claim 1, wherein the difference is a positive KPI change from the reference KPI to the predicted KPI.

* * * * *